US009828069B2

(12) United States Patent
Johnstone et al.

(10) Patent No.: US 9,828,069 B2
(45) Date of Patent: Nov. 28, 2017

(54) MOORING SYSTEM

(71) Applicant: Nautricity Limited, Glasgow (GB)

(72) Inventors: Cameron Johnstone, Dunblane (GB); Dave Pratt, Milngavie (GB)

(*) Notice: Subject to any disclaimer, the term of this patent is extended or adjusted under 35 U.S.C. 154(b) by 0 days.

(21) Appl. No.: 14/029,103

(22) Filed: Sep. 17, 2013

(65) Prior Publication Data
US 2014/0038479 A1   Feb. 6, 2014

Related U.S. Application Data

(63) Continuation of application No. PCT/GB2012/000251, filed on Mar. 19, 2012.

(30) Foreign Application Priority Data

Mar. 17, 2011 (GB) .................................. 1104524.2

(51) Int. Cl.
| | |
|---|---|
| B63B 22/18 | (2006.01) |
| B63B 21/50 | (2006.01) |
| F03B 17/06 | (2006.01) |
| B63B 21/20 | (2006.01) |
| B63B 22/04 | (2006.01) |

(52) U.S. Cl.
CPC .............. B63B 21/50 (2013.01); B63B 21/20 (2013.01); B63B 22/04 (2013.01); B63B 22/18 (2013.01); F03B 17/061 (2013.01); F05B 2240/97 (2013.01); Y02E 10/28 (2013.01)

(58) Field of Classification Search
CPC ................................ B63B 21/66; B63B 21/50
USPC ........................................................ 114/245
See application file for complete search history.

(56) References Cited

U.S. PATENT DOCUMENTS

| 3,807,341 | A | * | 4/1974 | Miller | 114/245 |
| 4,711,194 | A | * | 12/1987 | Fowler | 114/245 |
| 5,357,892 | A | * | 10/1994 | Vatne | A01K 73/045 |
| | | | | | 114/244 |
| 2002/0158472 | A1 | * | 10/2002 | Robson | 290/43 |
| 2010/0326343 | A1 | | 12/2010 | Hunt | |

FOREIGN PATENT DOCUMENTS

| GB | 2223728 | 4/1990 |
| GB | 2283285 | 5/1995 |
| WO | 0042318 | 7/2000 |

OTHER PUBLICATIONS

Search report received in corresponding GB application No. 1104524.2, dated May 6, 2011, 5 pages.

* cited by examiner

Primary Examiner — Stephen Avila
(74) Attorney, Agent, or Firm — Blank Rome LLP

(57) ABSTRACT

A mooring system (10) for use in mooring a marine device (24) within a fluid (12) subject to flow comprises a mooring line (16) to be secured to an anchor (18) and defining a tether point for a marine device (24), and a loading assembly (20) secured to the mooring line (16) and configured to generate hydrodynamic lift when exposed to flow to apply tension to the mooring line (16).

In embodiments of the invention the loading assembly (20) is configured to also generate a buoyancy force, such that tension is applied to the mooring line (16) by a combination of the hydrodynamic lift force and the buoyancy force.

30 Claims, 3 Drawing Sheets

MOORING SYSTEM

CROSS-REFERENCE TO RELATED APPLICATIONS

This application is a continuation of PCT Application number PCT/GB2012/000251 which was filed Mar. 19, 2012, which claims priority to Great Britain Patent Application No. 1104524.2 filed on Mar. 17, 2011, the contents of which are incorporated herein by reference.

FIELD OF THE INVENTION

The present invention relates to a mooring system, and in particular to a subsea mooring system for mooring marine equipment, such as turbine equipment.

BACKGROUND OF THE INVENTION

Various devices exist and have been proposed in the art for use in capturing energy from marine environments and converting this to electricity. For example, turbine systems have been proposed which convert the energy from tidal flows, wave motion, marine currents and the like. The methods and apparatus used to appropriately deploy and support such devices within a marine environment are of critical importance, particularly as most deployment sites are characterized by extreme environmental conditions, and thus high energy.

In some known arrangements energy conversion devices are supported via rigid structures, such as columns or frames, which are mounted on the seabed. Although such arrangements may provide robust anchoring they typically require complex installation, such as preparing suitable foundations, which might be difficult to achieve, especially in extreme environmental conditions. Further, these seabed mounted rigid structures may be difficult to deploy in larger water depths.

It is also known in the art to utilise mooring techniques for station keeping of subsea devices, such as tidal turbines. In one known arrangement a mooring line is secured between a seabed anchor and a conventional buoy which by virtue of its buoyancy applies tension to the mooring line, wherein a turbine is tethered to the tensioned line to be maintained in a suitable operational position. However, drag and other forces applied through the tethered turbine on the mooring line are typically of such magnitude that extremely large buoy volumes are necessary to apply appropriate tension within the mooring line. If appropriate buoyancy is not provided then this may result in large deviations of the subsea device and the mooring line, for example relative to the seabed anchor, which is undesirable and may result in the device not being held on station. Large buoy volumes, however, create additional drag and introduce unnecessary stresses and strains on the mooring line. All of this results in unfavourable dynamic motions being induced on the mooring line, which are ultimately transmitted to the tidal turbine and impact negatively on device stability and operational performance. Furthermore, the volume and hence associated buoyancy of such a buoy has to be sized for the maximum tidal velocity experienced at a site of deployment, meaning the buoy will be oversized for the vast amount of operational time. This over-sizing approach introduces additional parasitic drag which has to be compensated for by increasing the size and thus the holding power of the mooring anchors and line. This may increase the complexity, size, weight and costs of the system, and may create additional handling issues such as during transportation, deployment and maintenance.

SUMMARY OF THE INVENTION

According to a first aspect of the present invention there is provided a mooring system for use in mooring a marine device within a fluid subject to flow, comprising:

a mooring line to be secured to an anchor and defining a tether point for a marine device; and a loading assembly secured to the mooring line and configured to generate hydrodynamic lift when exposed to flow to apply tension to the mooring line;

The mooring system may be configured for use in a tidal flow, water current flow or the like.

The mooring system may be configured for use in mooring a marine device within a submerged, or at least partially submerged, position. The marine device may comprise a turbine assembly, such as a horizontal axis tidal turbine assembly. The marine device may be driven or operated by the flow of fluid. The marine device may comprise a vessel, such as a floating vessel, submersible vessel or the like.

In use, the loading assembly may function to establish a tension within the mooring line sufficient to maintain an associated tethered marine device within a desired position, or within a desired positional range. For example, forces applied via a tethered marine device, such as drag forces, thrust forces and the like may act to deviate the mooring line, wherein the lift generated by the loading assembly provides tension within the mooring line to react to these device originating forces, thus maintaining a desired position.

The lift generated within the loading assembly is proportional to the square of velocity of the surrounding fluid, such that the lift force will increase with increasing flow velocity. Accordingly, increasing flow velocities which will apply increasing drag and other forces and the like to the mooring line, for example via a tethered marine device, will be accommodated by an associated increase in lift force and therefore mooring line tension. The present invention may therefore permit a mooring system to be provided which passively reacts to local conditions. This may eliminate or substantially reduce the requirement and associated problems of providing a system which is designed for the most extreme conditions and which thus operates with significant redundancy for large periods of time.

The loading assembly may be configured to generate a generally upwardly directed hydrodynamic lift force. In such an arrangement the mooring line may be secured to an anchor which is positioned below the loading assembly, for example at a seabed location.

In an alternative embodiment the loading assembly may be configured to generate a generally downwardly directed hydrodynamic lift force. In such an arrangement the mooring line may be secured to an anchor which is positioned above the loading assembly, for example at a surface location.

The loading assembly may be considered to generate a dynamic force by virtue of the generated lift. That is, the generated lift is variable in accordance with a local condition, specifically flow velocity.

The loading assembly may be configured to also generate a static force to apply tension to the mooring line. Thus, tension may be applied to the mooring line by a combination of the hydrodynamic lift force and the static force.

The static force may be generated as a substantially constant force, for example independent of one or more local conditions, such as flow conditions. The static force may be substantially independent of flow velocity.

The static force may be configured to establish a minimum desired tension within the mooring line, for example in the event of minimal flow conditions when the loading assembly will be generating minimal hydrodynamic lift forces. In such an arrangement the loading assembly may be configured to generate a static force which is appropriately sized for minimal flow conditions, which may permit a smaller loading assembly to be used in comparison to conventional mooring buoy systems which are typically sized according to maximum flow conditions, which may be rarely experienced.

The loading assembly may comprise a common structure configured to generate both the hydrodynamic lift force and the static force. In such an arrangement, a simplified loading assembly may be provided which includes a structure configured to provide both the hydrodynamic lift force and the static force.

The loading assembly may comprise separate structures configured to separately generate the hydrodynamic lift force and static force.

The loading assembly may comprise at least one buoyant structure configured to generate a buoyancy force when at least partially submerged within the fluid. In such an arrangement the loading assembly may be configured to generate an upwardly directed static force.

The at least one buoyant structure may be configured to generate a buoyancy force for applying a minimum desired tension within the mooring line, for example in the event of minimal flow velocities. As such, the volume of the buoyant structure may be minimised, thus eliminating or alleviating problems associated with oversized mooring buoys.

At least one buoyant structure may define a profile configured to generate hydrodynamic lift when exposed to flow.

In some embodiments the loading assembly may comprise at least one buoyant structure which is not configured to generate hydrodynamic lift. For example, at least one buoyant structure may define a bluff body.

The loading assembly may comprise a ballast system. The ballast system may be configured to modify the buoyancy within the loading assembly.

The static force may be provided by a weighted structure. In such an arrangement the loading assembly may be configured to apply a static force in a generally downward direction.

The loading assembly may comprise at least one hydrofoil section configured to generate hydrodynamic lift. At least one hydrofoil section may define a buoyant structure, such that said hydrofoil section is configured to generate both a hydrodynamic lift force and a buoyancy force to apply tension to the mooring line.

The loading assembly may comprise a single hydrofoil section. For example, the single hydrofoil section may substantially define the loading assembly. The loading assembly may comprise a plurality of hydrofoil sections. For example, multiple hydrofoil sections may be secured to a common structure, such as a nacelle, fuselage, bulb or the like. The common structure may define a buoyant structure.

The loading assembly may comprise a hydrofoil section having at least one end cap arrangement configured to reduce or minimise hydrodynamic drag caused by hydrofoil end effects, such as vortex shedding. Opposing ends of a hydrofoil section may comprise an end cap arrangement. At least one end cap arrangement may comprise a plate. At least one delta-shaped end cap may be provided.

The angle of attack of the hydrofoil section may be selected to provide optimum lift.

The angle of attack of the hydrofoil section may be selected to maintain a centre of buoyancy of the hydrofoil section between leading and trailing edges thereof. This may permit an optimum angle of attack to be maintained.

The angle of attack of the hydrofoil section relative to the flow may be fixed. For example, the angle of attack may be fixed to provide an optimum angle of attack for the particular hydrofoil section. Such an optimum angle of attack may be selected to provide maximum lift.

The angle of attack of the hydrofoil section relative to the flow may be adjustable. For example, the angle of attack may be adjustable to maintain an optimum angle of attack for the particular hydrofoil section and flow conditions. Such adjustment may be active, for example via an actuator system. In other embodiments such adjustment may be passive.

The angle of attack of the hydrofoil section may be adjustable to maintain a centre of buoyancy of the hydrofoil section between leading and trailing edges thereof. This arrangement may assist to permit an optimum angle of attack to be achieved and maintained.

The mooring system may comprise a swivel arrangement for use in permitting adjustment of the angle of attack of the hydrofoil section. The swivel arrangement may comprise a yoke to which the hydrofoil section is mounted, wherein the yoke defines a pivot point about which the hydrofoil section may be rotated to adjust the angle of attack. The hydrofoil section may be secured to the yoke via one or more elongate components. Such elongate components may define a bridle system. The elongate components may be configured, for example sized, to permit the hydrofoil section to adopt a desired angle of attack. At least one elongate component may define an adjustable length. This may permit adjustment of the angle of attack of the hydrofoil section to be achieved.

At least one elongate component may comprise a rigid component. At least one elongate component may comprise a flexible component, such as a wire, chain, rope or the like. At least one elongate component may be secured to a leading edge of the hydrofoil section, and at least one elongate component may be secured to a trailing edge of the hydrofoil section. In such an arrangement the size of each elongate component securing the leading and trailing edges of the hydrofoil section to the yoke may be selected to maintain the centre of buoyancy of the hydrofoil section between said leading and trailing edges.

An end region of the mooring line may be secured to the loading assembly via the swivel arrangement.

The swivel arrangement may be configured to provide an attachment point for a marine device.

The loading assembly may comprise a thrust arrangement. The thrust arrangement may be configured to apply an active thrust within the loading assembly. The thrust arrangement may be considered to be an active arrangement, whereas the hydrodynamic lift generated by the loading assembly may be considered to be a passive arrangement.

The thrust arrangement may comprise one or more thrusters, such as bladed thrusters, jet thrusters or the like.

The thrust arrangement may be mounted or secured relative to a hydrofoil section of the loading arrangement. For example, the thrust arrangement may be mounted or secured relative to one or more wing tips associated with a hydrofoil section of the loading arrangement.

The thrust arrangement may be configured to be selectively activated, for example when environmental conditions may require the thrust effect of such thrust arrangement.

Such environmental conditions may include relatively high flow velocities, for example in excess of 5 knots and perhaps in excess of 7 knots. Environmental conditions may include turbulent conditions. In such environmental conditions the lift achieved by the loading assembly could be compromised, in which case the provision of the thrust arrangement may address this.

The thrust arrangement may be configured to provide a thrust within the loading arrangement to effectively apply tension within the mooring line.

The thrust arrangement may be configured to provide a thrust which assist in controlling the angle of attack of the loading assembly, such as a hydrofoil section. Such an arrangement may assist in permitting a desired lift to be achieved.

The thrust arrangement may be configured to be powered by an on-board power supply.

The thrust arrangement may be configured to be powered by power from an associated marine device, such as a turbine assembly. The marine device may be tethered to the mooring line. The thrust arrangement may be configured to be powered from power generated by a turbine installation, which turbine installation may include the mooring system of the present invention.

The mooring system may permit a marine device to be secured thereto at a location between the anchor and the loading assembly.

The mooring system may permit a marine device to be secured at a location which is intermediate opposing the ends of the mooring line.

The mooring system may permit a marine device to be secured to an end region of the mooring line.

The mooring system may comprise an anchor to which the mooring line is secured. The anchor may comprise a subsea anchor. The anchor may be provided on a seabed. The anchor may be fixed to the sea bed, for example via a pile system. The anchor may be mounted on the seabed. For example, the anchor may comprise a gravity based anchor.

The anchor may be located at a surface or topside location. For example, the anchor may be provided on a floating structure.

The mooring line may comprise a single elongate structure. The mooring line may comprise a plurality of elongate structures. The mooring line may comprise one or more wires, ropes, chains or the like.

The mooring system may comprise an alignment assembly configured to maintain appropriate positioning relative to the bulk flow direction of the fluid. For example, the mooring system may comprise a hydrodynamic vane assembly configured to orientate the loading assembly into the direction of bulk fluid flow. Such an arrangement may have particular application within fluid flows which are subject to direction changes, such as tidal flows.

The mooring system may comprise a rudder assembly. Such a rudder assembly may be configured to provide directional control.

According to a second aspect of the present invention there is provided a method of mooring a marine device within a fluid subject to flow, the method comprising:
  securing a mooring line to an anchor;
  securing a loading assembly to the mooring line;
  securing a marine device relative to the mooring line; and
  using the loading assembly to generate hydrodynamic lift to apply tension to the mooring line Features associated with the first aspect and the defined and implied methods of use of such features may be applied to the method according to the second aspect. For example, the method may comprise using the loading assembly to also generate a static force, such as a buoyancy force to apply tension to the mooring line.

According to a third aspect of the present invention there is provided a mooring system for use in a fluid subject to flow, comprising:
  a mooring line to be secured to an anchor; and
  a buoy assembly secured to the mooring line and defining a profile configured to generate hydrodynamic lift when exposed to flow, wherein the buoy applies tension to the mooring line by a combination of buoyancy and the generated hydrodynamic lift forces.

Features associated with the first aspect may be applied to the third aspect.

According to a fourth aspect of the present invention there is provided a loading assembly for applying tension to a mooring line within a fluid subject to flow, comprising a structure to be coupled to a mooring line and being configured to generate hydrodynamic lift when exposed to flow to apply tension to the mooring line.

According to a fifth aspect of the present invention there is provided a loading assembly for applying tension to a mooring line within a fluid subject to flow, comprising a buoyant structure to be coupled to a mooring line and defining a profile configured to generate hydrodynamic lift when exposed to flow, wherein the structure applies tension to the mooring line by a combination of buoyancy and the generated hydrodynamic lift forces.

Features defined above in relation to any other aspect may be applied to the fourth or fifth aspects.

BRIEF DESCRIPTION OF THE DRAWINGS

These and other aspects of the present invention will now be described, by way of example only, with reference to the accompanying drawings, in which.

DETAILED DESCRIPTION OF THE DRAWINGS

Figure 1:
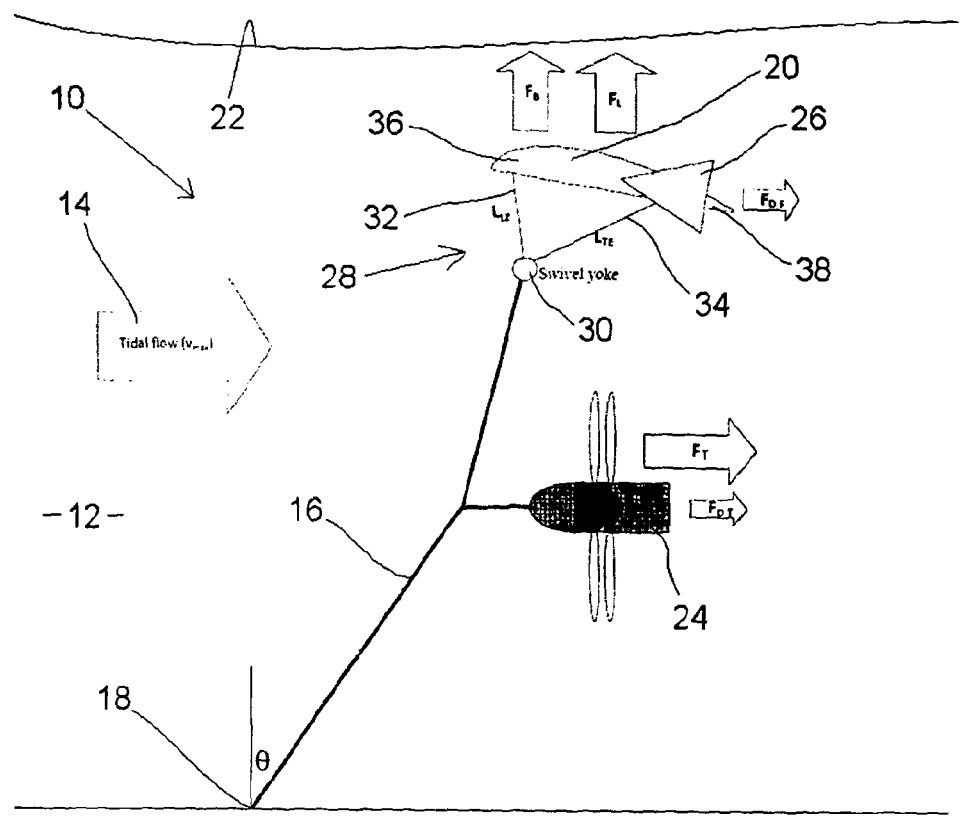
FIG. 1 is a diagrammatic illustration of a mooring system according to an embodiment of the present invention.

A mooring system, generally identified by reference numeral 10, in accordance with an embodiment of the present invention is shown in FIG. 1. The mooring system 10 is illustrated in use within a body of water 12 subject to a tidal flow, the direction of which is illustrated by arrow 14. The system 10 includes a mooring line 16, such as a length of chain, which is secured at a lower end to a seabed anchor 18 and at an upper end to a loading assembly in the form of a buoy 20, which is fully submerged below the surface 22 of the water 12. A marine device, which in the present embodiment is illustrated as a tidal turbine 24, is secured to the mooring line 16 intermediate the anchor 18 and buoy 20. During use drag and thrust forces associated with the turbine 24 apply a horizontal pull on the mooring line 16. In this respect the function of the buoy 20 is to generate an upward force to apply tension to the mooring line 16 to resist such a horizontal pull and restrict the deflection angle θ of the mooring line 16 to within an acceptable range.

Figure 2:
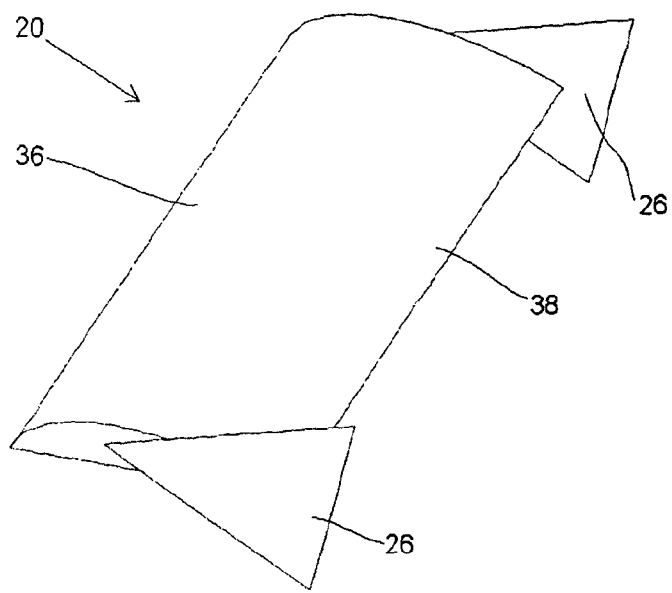
FIG. 2 is a perspective view of a mooring buoy which forms part of the mooring system shown in FIG. 1.

The buoy 20, which is also illustrated in perspective view in FIG. 2, defines a hydrofoil profile which is configured to generate a hydrodynamic lift force ($F_L$) when exposed to the tidal flow 14. The generated lift is a dynamic force in that it is proportional to the square of the fluid velocity, and as such the buoy 20 will generate increasing lift force with increasing flow velocity. Accordingly, increasing flow velocities which will apply increasing drag and other forces on the mooring line 16 via the tethered turbine 24 will be accommodated by an associated increase in lift force and therefore mooring line tension. The mooring system 10 may therefore passively react to local conditions. This may eliminate or substantially reduce the requirement and associated problems of providing a system which is designed with a volume and buoyancy to accommodate the most extreme conditions and which thus operates with significant redundancy for large periods of time.

The buoy 20 comprises delta-shaped end caps 26 which function to minimise drag forces associated with the buoy, for example by controlling the generation and shedding of vortices from the end regions of the buoy hydrofoil profile.

The buoy 20 is also buoyant within the water 12 and thus generates a buoyancy force ($F_B$) which contributes to the tension being applied within the mooring line 16. The buoyancy force may be considered to be a static force, for example in that the buoyancy force remains substantially constant irrespective of flow velocity. It should be understood, however, that during use some variations in the generated buoyancy force may be experienced which is associated with submerged depth, for example due to the possible compressible nature of the water 12 and thus a possible increase in fluid density with depth. However, such variations may be considered negligible.

The buoyancy force may be configured to establish a minimum desired tension within the mooring line 16, for example in the event of minimal tidal flow conditions, such as may be achieved during tide reversal, when the buoy 20 will be generating minimal hydrodynamic lift forces. In such an arrangement the volume of the buoy 20 may be appropriately selected for such minimal flow conditions, which may permit a smaller loading assembly to be used in comparison to conventional mooring buoy systems which are typically sized according to maximum flow conditions, which may be rarely experienced.

As noted above, during use drag and thrust forces associated with the turbine 24 will be applied to the mooring line 16. These forces will largely be proportional to the square of the flow velocity, and hence will be at a maximum when the flow velocity is at a maximum. Accordingly, having knowledge of the maximum flow velocity ($V_{max}$), which may be obtained through direct measurement, calculation, from tidal flow charts or the like, will permit maximum expected forces imparted on the mooring line by the turbine 24 to be determined or estimated. This knowledge, in combination with a desired deflection angle range θ, can be used to determine or estimate the required upward force ($F_L$ and $F_B$) to be applied by the buoy 20, which may in turn inform the properties of the buoy 20, such as hydrofoil geometry and volume.

The buoy 20 is secured to the mooring line via a swivel arrangement 28 which permits the angle of attack of the buoy 20 to be passively set and adjusted. The swivel arrangement 28 comprises a swivel yoke 30 to which the buoy 20 is pivotably secured via custom lengths of wire 32, 34 which extend between the swivel yoke 30 and leading and trailing edge regions 36, 38, respectively, of the buoy 20. The swivel arrangement 28 functions to maintain the centre of buoyancy of the buoy 20 between the leading and trailing edges 36, 38 of the buoy 20 for all velocities of the tidal flow 14. Accordingly, maximum lift forces ($F_L$) may be generated for all states of the tidal cycle.

Figure 3:
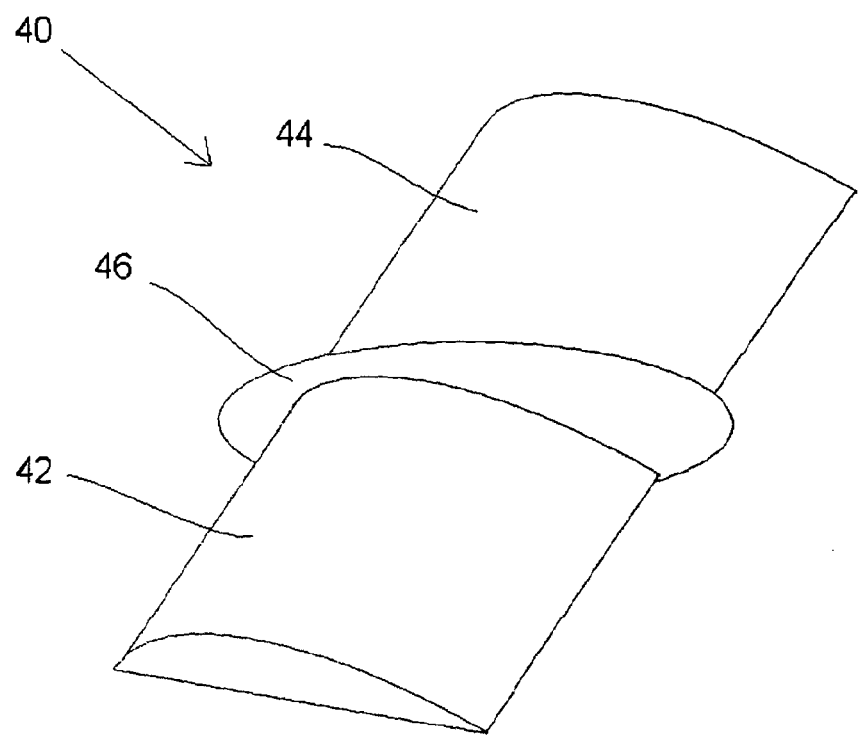
FIG. 3 is a perspective view of an alternative embodiment of a mooring buoy associated with aspects of the present invention.

Reference is now made to FIG. 3 in which there is shown a perspective view of a buoy, generally identified by reference numeral 40, in accordance with an alternative embodiment of the present invention. The illustrated buoy 40 comprises two separate hydrofoil sections 42, 44 which are secured to a central bulb 46. In this arrangement the bulb 46 may provide some structural integrity to the buoy 40, for example where large hydrofoil sections 42, 44 are required. Furthermore, the bulb 46 may permit a desired buoyancy of the entire buoy 40 to be achieved without disturbing the design of each hydrofoil section 42, 44. The operation of the buoy 40 shown in FIG. 3 is similar to that of the buoy 20 first shown in FIG. 1 and as such no further description will be given.

Figure 4:
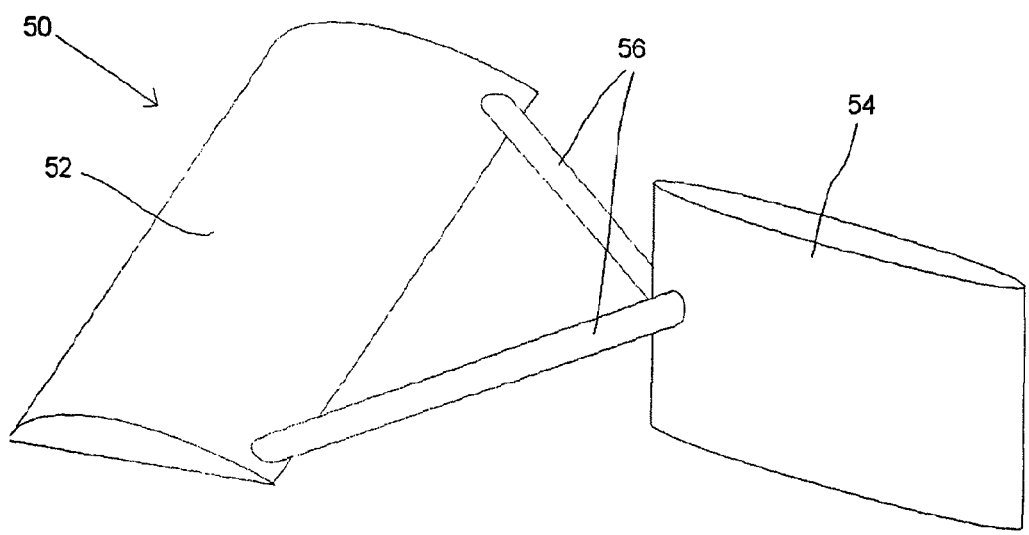
FIG. 4 is a perspective view of another alternative embodiment of a mooring buoy associated with aspects of the present invention.

A further alternative embodiment of a buoy, in this case generally identified by reference numeral 50, is illustrated in FIG. 4. In this embodiment the buoy 50 includes a hydrofoil section 52 and a tail-fin 54 secured thereto via structural members 56. The tail-fin 54 may function to continuously direct the buoy 50 into the direction of fluid flow. This may assist transition movement during tide reversal.

Figure 5:
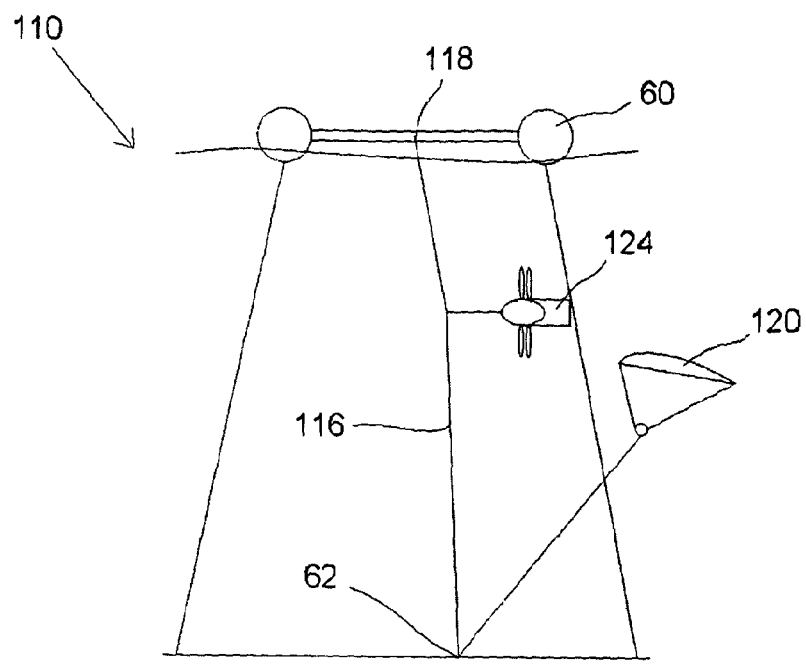
FIG. 5 is a diagrammatic illustration of a mooring system according to another embodiment of the present invention.

Reference is now made to FIG. 5 in which there is shown a mooring system, generally identified by reference numeral 110, in accordance with an alternative embodiment of the present invention. The system 110 has features in common with the system 10 of FIG. 1 and as such like components share like reference numerals, incremented by 100. Thus, the system 110 comprises a mooring line 116 to which a tidal turbine 124 is tethered, wherein a buoy 120 having a hydrofoil profile is used to apply tension to the line 116. However, in the present embodiment the mooring line 116 is secured to an anchor 118 mounted on a floating structure 60, such as a pontoon structure, and extends downwardly to a seabed mounted eyelet structure 62. The line 116 passes through the eyelet structure 62 and is connected to the buoy 120 which generates an upward force by a combination of hydraulic lift and buoyancy to apply tension to the mooring line 116.

Figure 6:
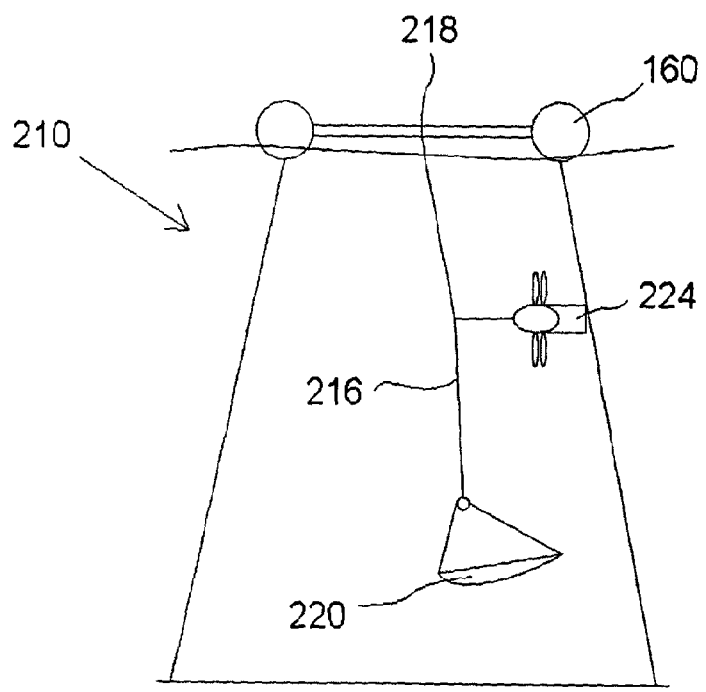
FIG. 6 is a diagrammatic illustration of a mooring system according to a further embodiment of the present invention.

A further alternative embodiment of a mooring system, in this case generally identified by reference numeral 210 is shown in FIG. 6. The mooring system 210 is similar to the system 110 shown in FIG. 5 and as such like components share like reference numerals, incremented by 100. Accordingly, the system 210 includes a mooring line 216 which is secured to an anchor 218 provided on a floating structure 160, wherein a turbine 224 is tethered to the mooring line 216. The lower end of the mooring line 216 is secured to a weighted structure 220 which pulls downward on the line 216 thus applying tension thereto. This downward force by virtue of the weight of the structure 220 may be considered to be a static force. Furthermore, the weighted structure 220 defines a hydrofoil profile which is configured to generate a lift force in a downward direction to therefore further apply tension to the line 216.

It should be understood that the embodiments described herein are merely exemplary and that various modifications may be made thereto without departing form the scope of the invention. For example, in the illustrated embodiments the tethered device is a turbine. However, the present invention may be provided for use with other marine devices, such as floating, semi-submerged or fully submerged vessels. Furthermore, the present invention may be utilised to provide support, such as tensile support, to marine structures, for example riser structures, flow lines and the like which may be used in the oil and gas industry. Furthermore, a marine device, component or structure may be tethered to any suitable point within the system. For example, a marine device may be secured to the mooring line at the same point of connection as the buoy.

Further, the present invention in some embodiments may include an active thrust arrangement, such as may be provided by one or more thrusters, for example mounted on a hydrofoil section and/or bulb of the buoy, and which is configured to apply an active thrust on the buoy. The thrust arrangement may be selectively activated when certain environmental conditions are experienced, such as in high flow velocities and/or turbulent flow. The thrust generated may be used to apply tension within the mooring line, and/or to assist in controlling the angle of attack of the buoy to permit a required lift force to be generated. The thrust arrangement may be powered by any suitable means, but in some embodiments the thrust arrangement may be powered by a tethered turbine or a larger turbine installation.

The invention claimed is:

1. A mooring system for use in mooring a tidal marine device within a fluid subject to tidal flow, comprising:
    a mooring line configured to secure at least a tidal marine device and a loading assembly to an anchor, the mooring line comprising a first tether point for such a loading assembly and comprising a separate second tether point for such a tidal marine device; and
    a loading assembly separately secured to the mooring line from the first tether point, wherein the loading assembly is a single, common structure configured to generate hydrodynamic lift when exposed to tidal flow as well as a static buoyancy force, both the hydrodynamic lift and the static buoyancy force being provided by the loading assembly, the loading assembly being configured to apply tension to the mooring line in use to maintain an associated tidal marine device, tethered to the mooring line at the second tether point, within a desired position or positional range.

2. The system according to claim 1, wherein the static buoyancy force is substantially independent of flow velocity.

3. The system according to claim 1, wherein the static buoyancy force is configured to establish a minimum desired tension within the mooring line.

4. The system according to claim 1, wherein the loading assembly is configured to generate a buoyancy force for applying a minimum desired tension within the mooring line.

5. The system according to claim 1, wherein the loading assembly defines a profile configured to generate hydrodynamic lift when exposed to tidal flow.

6. The system according to claim 1, wherein the loading assembly comprises at least one hydrofoil section configured to generate hydrodynamic lift.

7. The system according to claim 6, wherein at least one hydrofoil section defines a buoyant structure, such that said hydrofoil section is configured to generate both a hydrodynamic lift force and a buoyancy force to apply tension to the mooring line.

8. The system according to claim 6, wherein the loading assembly comprises a single hydrofoil section.

9. The system according to claim 6, wherein the loading assembly comprises a plurality of hydrofoil sections.

10. The system according to claim 9, wherein the single common structure comprises multiple hydrofoil sections secured thereto.

11. The system according to claim 6, wherein the loading assembly comprises a hydrofoil section having at least one end cap arrangement configured to reduce or minimize hydrodynamic drag.

12. The system according to claim 6, wherein the angle of attack of the hydrofoil section is selected to maintain a center of buoyancy of the hydrofoil section between leading and trailing edges thereof.

13. The system according to claim 6, wherein the angle of attack of the hydrofoil section relative to the tidal flow is adjustable.

14. The system according to claim 6, comprising a swivel arrangement for use in permitting at least one of selecting and adjusting of the angle of attack of the hydrofoil section.

15. The system according to claim 14, wherein the swivel arrangement comprises a yoke to which the hydrofoil section is mounted, wherein the yoke defines a pivot point about which the hydrofoil section is rotated to adjust the angle of attack.

16. The system according to claim 15, wherein the hydrofoil section is secured to the yoke via one or more elongate components.

17. The system according to claim 16, wherein the elongate components are sized to permit the hydrofoil section to adopt a desired angle of attack.

18. The system according to claim 16, wherein at least one elongate component is secured to a leading edge of the hydrofoil section, and at least one elongate component is secured to a trailing edge of the hydrofoil section.

19. The system according to claim 1, comprising a thrust arrangement configured to apply an active thrust within or on the loading assembly.

20. The system according to claim 19, wherein the thrust arrangement comprises one or more thrusters.

21. The system according to claim 19, wherein the thrust arrangement is configured to be selectively activated.

22. The system according to claim 19, wherein the thrust arrangement is configured to provide a thrust within the loading arrangement to effectively apply tension within the mooring line.

23. The system according to claim 19, wherein the thrust arrangement is configured to provide a thrust which assists in controlling the angle of attack of the loading assembly.

24. The system according to claim 19, wherein the thrust arrangement is configured to be powered by at least one of an on-board power supply and power generated by a tethered tidal marine device.

25. The system according to claim 1, comprising an anchor to which the mooring line is secured.

26. The system according to claim 25, wherein the anchor comprises a subsea anchor, such as a seabed anchor.

27. The system according to claim 25, wherein the anchor comprises a surface or topside anchor.

28. A method of mooring a tidal marine device within a fluid subject to tidal flow, the method comprising:
    securing a mooring line to an anchor, the mooring line comprising a first tether point for a loading assembly and comprising a separate second tether point for a tidal marine device;
    separately securing a loading assembly to the mooring line, the loading assembly having a single, common structure configured both to generate hydrodynamic lift when exposed to tidal flow as well as a static buoyancy force;

securing a tidal marine device to the second tether point on the mooring line; and using the single common structure loading assembly both to generate hydrodynamic lift and a static buoyancy force to apply tension to the mooring line to maintain the tidal marine device, tethered to the second tether point, within a desired position or positional range.

29. A tidal mooring system for use in a fluid subject to tidal flow, comprising:

a mooring line configured to secure at least a tidal marine device and a buoy assembly to an anchor, the mooring line comprising a first tether point for such a buoy assembly and comprising a separate second tether point for such a tidal marine device; and a buoy assembly separately secured to the mooring line from the first tether point, wherein the buoy assembly is configured as a single, common structure configured both to generate a static buoyancy force and define a profile configured to generate hydrodynamic lift when exposed to tidal flow, wherein the buoy assembly applies tension to the mooring line by a combination of buoyancy and the generated hydrodynamic lift forces to maintain an associated tidal marine device, tethered to the second tether point, within a desired position or positional range.

30. The system according to claim 1, wherein the loading arrangement is pivotably secured to the mooring line via a swivel arrangement.

* * * * *